US011163838B2

(12) United States Patent
Hewitt et al.

(10) Patent No.: US 11,163,838 B2
(45) Date of Patent: Nov. 2, 2021

(54) SHARED URL CONTENT UPDATE TO IMPROVE SEARCH ENGINE OPTIMIZATION

(71) Applicant: International Business Machines Corporation, Armonk, NY (US)

(72) Inventors: Trudy L. Hewitt, Cary, NC (US); Joseph Lam, Markham (CA); William K. Wentworth, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/363,439

(22) Filed: Mar. 25, 2019

(65) Prior Publication Data
US 2019/0220489 A1    Jul. 18, 2019

Related U.S. Application Data

(63) Continuation of application No. 15/629,042, filed on Jun. 21, 2017, now Pat. No. 10,303,724, which is a continuation of application No. 14/659,182, filed on Mar. 16, 2015, now Pat. No. 9,697,286.

(51) Int. Cl.
  *G06F 16/951* (2019.01)
  *G06F 16/955* (2019.01)
(52) U.S. Cl.
  CPC ........ *G06F 16/951* (2019.01); *G06F 16/9566* (2019.01)
(58) Field of Classification Search
  CPC ............................ G06F 16/951; G06F 16/9566
  USPC ....................................................... 707/706
  See application file for complete search history.

(56) References Cited

U.S. PATENT DOCUMENTS

| 7,260,568 | B2 | 8/2007 | Zhang et al. |
| 7,574,436 | B2 | 8/2009 | Kapur et al. |
| 8,055,669 | B1 | 11/2011 | Singhal et al. |
| 8,126,868 | B1 | 2/2012 | Vincent |
| 8,285,702 | B2 | 10/2012 | Carmel et al. |
| 8,312,022 | B2 | 11/2012 | Wilde et al. |
| 8,515,937 | B1 | 8/2013 | Sun et al. |
| 8,626,823 | B2 | 1/2014 | Kumar |
| 9,866,526 | B2 | 1/2018 | Kamdar et al. |
| 2003/0055816 | A1 | 3/2003 | Paine et al. |
| 2007/0208730 | A1 | 9/2007 | Agichtein et al. |
| 2009/0055384 | A1 | 2/2009 | Jain et al. |
| 2009/0240674 | A1* | 9/2009 | Wilde .................. G06F 16/957 |
| 2009/0299978 | A1 | 12/2009 | Farfurnik et al. |
| 2010/0017348 | A1 | 1/2010 | Pinckney et al. |

(Continued)

OTHER PUBLICATIONS

Li, Xiao, et al., "Learning with Click Graph for Query Intent Classification", ACM Transactions on Information Systems, vol. 28, No. 3, Article 12, Jun. 2010, pp. 1-12.*

(Continued)

*Primary Examiner* — Robert Stevens
(74) *Attorney, Agent, or Firm* — Scully, Scott, Murphy & Presser, P.C.; Robert J. Shatto, Esq.

(57) ABSTRACT

A computer program product, a method, and an information handling system is provided to associate keywords used for unsuccessfully searching for a shared URL contents with a confidence level of predicting an adjustment of search engine optimization (SEO) for finding the shared URL due to changing the shared URL contents and performing an action based on the confidence level.

20 Claims, 3 Drawing Sheets

(56) References Cited

U.S. PATENT DOCUMENTS

| | | |
|---|---|---|
| 2012/0290553 A1 | 11/2012 | England et al. |
| 2014/0025496 A1 | 1/2014 | Davitz et al. |
| 2014/0040243 A1 | 2/2014 | Rubinstein et al. |
| 2015/0100563 A1 | 4/2015 | Ellis |
| 2015/0142711 A1 | 5/2015 | Pinckney et al. |
| 2016/0275188 A1 | 9/2016 | Hewitt et al. |

OTHER PUBLICATIONS

"Search engine optimization", Wikipedia, downloaded: Jun. 23, 2021, pp. 1-8.*

Wilson et al., "Search engine optimisation: A primer on keyword strategies", Journal of Direct, Data and Digital Marketing Practice, vol. 8, Issue 2, Oct. 2006, pp. 121-133.

Zhang et al., "Bid Keyword suggestion in sponsored search based on competitiveness and relevance", Information Processing and Management, vol. 50, Issue 4, Jul. 2014, pp. 508-523.

Killoran, "How to Use Search Engine Optimization Techniques to Increase Website Visibility", IEEE Transactions on Professional Communication, vol. 56, No. 1, Mar. 2013, pp. 50-66.

List of IBM Patents or Patent Applications Treated as Related Mar. 25, 2019, 2 pages.

\* cited by examiner

SHARED URL CONTENT UPDATE TO IMPROVE SEARCH ENGINE OPTIMIZATION

CROSS REFERENCE TO RELATED APPLICATIONS

This application is a continuation of copending U.S. patent application Ser. No. 15/629,042, filed Jun. 21, 2017, which is a continuation of U.S. patent application Ser. No. 14/659,182, filed Mar. 16, 2015. The entire contents and disclosures of U.S. patent application Ser. Nos. 15/629,042 and 14/659,182 are hereby incorporated herein by reference in their entireties.

BACKGROUND

The invention relates to a computing environment, and more particularly to a computer program, method, and system for identifying improvements in a shared URL contents to improve a search engine's ability to find information in the shared URL contents, that is, a search engine optimization (SEO).

SUMMARY

According to one embodiment of the invention, there is provided a computer program product predicting an adjustment of SEO of a shared URL due to changing a shared URL contents comprising a plurality of instructions stored thereon, which, when executed by a processor, cause the processor to perform operations. The operations performed include receiving a shared URL with a shared URL contents answering a question from an unsuccessful search effort by a user to find the shared URL contents. The computer program product retrieving at least one keyword from the unsuccessful search effort. The computer program product associating at least one keyword from the keywords with the shared URL contents. The computer program product characterizing the at least one keyword to form an at least one keyword shared URL contents characterization. The computer program product utilizing the at least one keyword shared URL contents characterization to predict a confidence level of adjusting of the SEO of the shared URL based on changing the at least one keyword in the shared URL contents and performing an action based on the confidence level.

According to another embodiment of the invention there is a method for predicting an adjustment of SEO of a shared URL due to changing a shared URL contents, the method implemented by a processor. The method receiving a shared URL with a shared URL contents answering a question from an unsuccessful search effort by a user to find the shared URL contents. The method retrieving at least one keyword from the unsuccessful search effort. The method associating at least one keyword from the keywords with the shared URL contents. The method characterizing the at least one keyword to form an at least one keyword shared URL contents characterization. The method utilizing the at least one keyword shared URL contents characterization to predict a confidence level of adjusting of the SEO of the shared URL based on changing the at least one keyword in the shared URL contents and performing an action based on the confidence level.

According to another embodiment of the invention there is an information handling system for predicting an adjustment of SEO of a shared URL due to changing a shared URL contents, the information handling system comprising: at least one processor; a memory coupled to the at least one processor; a set of instructions stored in the memory and executed by the at least one processor wherein the set of instructions perform operations. The operations including receiving a shared URL with a shared URL contents answering a question from an unsuccessful search effort by a user to find the shared URL contents. The operations including retrieving at least one keyword from the unsuccessful search effort. The operations including associating at least one keyword from the keywords with the shared URL contents. The operations including characterizing the at least one keyword to form an at least one keyword shared URL contents characterization. The operations including utilizing the at least one keyword shared URL contents characterization to predict a confidence level of adjusting of the SEO of the shared URL based on changing the at least one keyword in the shared URL contents and performing an action based on the confidence level.

BRIEF DESCRIPTION OF THE DRAWINGS

The above-mentioned features of the present invention may be better understood, and its numerous objects, features, and advantages made apparent to those skilled in the art by taken in conjunction with the accompanying drawings wherein like reference numerals denote like elements and in which.

DETAILED DESCRIPTION

Embodiments of the invention are described below with reference to drawings in detail.

Often, people recognize a need to find information to complete a task, an assignment, or answer a question. Many people have devices that they use to search for the information needed to complete the task. A user of the device will typically use a Browser or a search engine to find the information. If the user is not successful, then the user may try getting help to receive the information. While the user is getting help, the user may be directed to a URL where the information is available. For the purposes of this disclosure the URL to which the user is directed is called a shared URL. Since the information is available on the shared URL, there are many cases, where updating the keywords in the content of the shared URL; hereafter referred to as "shared URL contents" would improve the ability for a search engine to find the information. Currently, the user's history for searching the information is not used to update the shared URL contents.

In view of the deficiencies in prior art, various method, system, and computer program product embodiments of the invention are provided herein. This invention takes advantage of a plurality of user's attempts to find the information to make a determination if the shared URL content should be updated according to a policy and may in some embodiments recommend updating or actually making updates to the shared URL contents.

Figure 1:
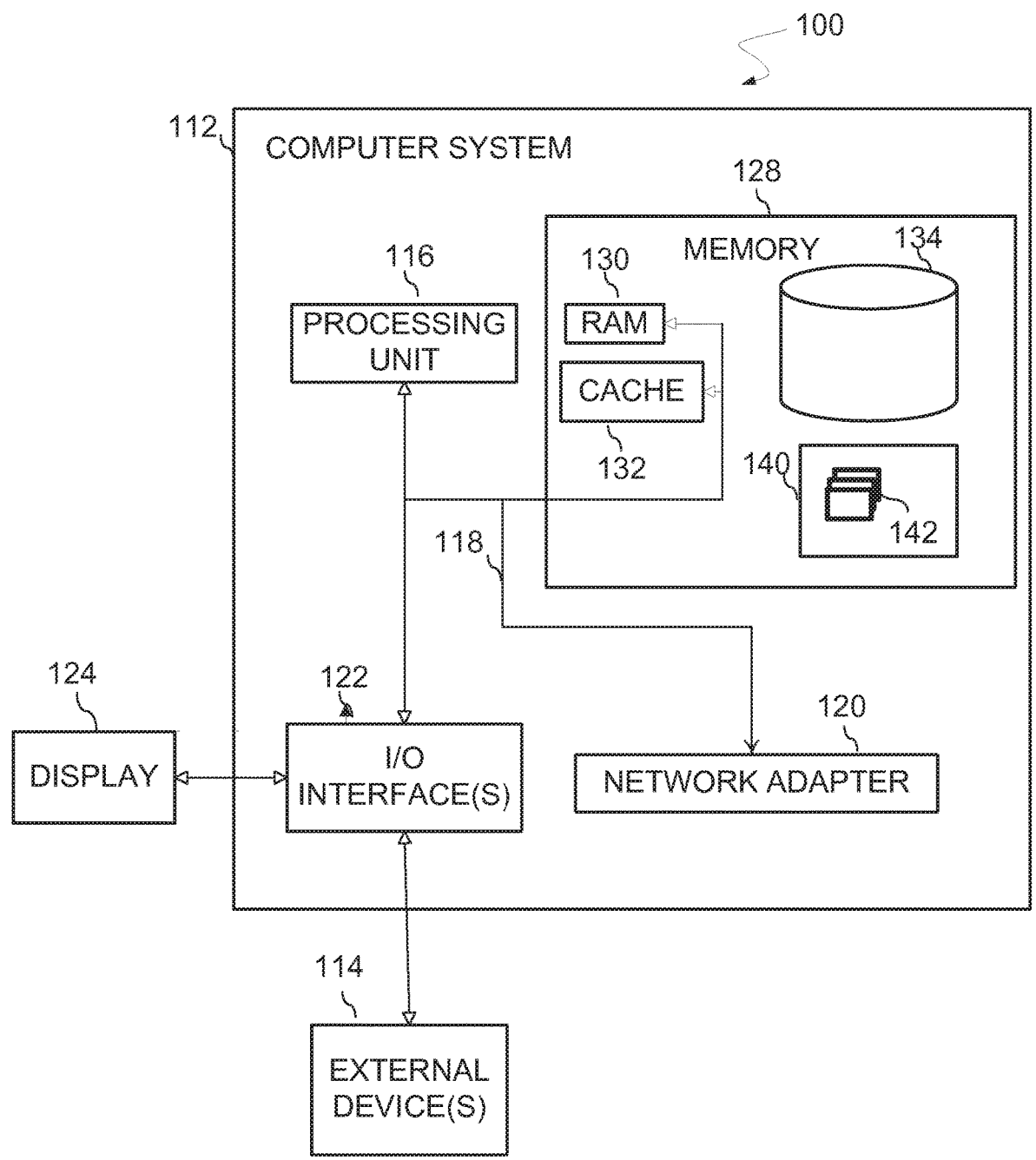
FIG. 1 depicts a computer system 100 according to an embodiment of the present invention and is a block diagram example of a data processing system in which the methods described herein can be implemented.

Referring to FIG. 1, a schematic of a processing system 100 is shown wherein the methods of this invention may be implemented. The processing system 100 is only one example of a suitable system and is not intended to suggest any limitation as to the scope of use or functionality of embodiments of the invention described herein. Regardless, the system 100 is capable of implementing and/or performing any of the functionality set forth herein. In the system 100 there is a computer system 112, which is operational with numerous other general purpose or special purpose computing system environments or configurations. Examples of well-known computing systems, environments, and/or configurations that may be suitable for use with the computer system 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 112 may be described in the general context of computer system-executable instructions, such as program modules, being executed by a computer system. Generally, program modules may include routines, programs, objects, components, logic, data structures, and so on that perform particular tasks or implement particular abstract data types. The computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 112 in the system environment 100 is shown in the form of a general-purpose computing device. The components of the computer system 112 may include, but are not limited to, a set of one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 112 typically includes a variety of computer system readable media. Such media may be any available media that is accessible by the computer system 112, and it includes both volatile and non-volatile media, removable and non-removable media.

The system memory 128 can include computer system readable media in the form of volatile memory, such as random access memory (RAM) 130 and/or a cache memory 132. The computer system 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the system memory 128 may include at least one program product having a set (e.g., at least one) of program modules 142 that are configured to carry out the functions of embodiments of the invention.

A program/utility 140, having the set (at least one) of program modules 142, may be stored in the system memory 128 by way of example, and not limitation, as well as an operating system, one or more application programs, other program modules, and program data. Each of the operating systems may have one or more application programs, other program modules, and program data or some combination thereof, and may include an implementation of a networking environment. The program modules 142 generally carry out the functions and/or methodologies of embodiments of the invention as described herein.

The computer system 112 may also communicate with a set of one or more external devices 114 such as a keyboard, a pointing device, a display 124, a tablet, a digital pen, etc. wherein these one or more devices enable a user to interact with the computer system 112; and/or any devices (e.g., network card, modem, etc.) that enable the computer system 112 to communicate with one or more other computing devices. Such communication can occur via Input/Output (I/O) interfaces 122. These include wireless devices and other devices that may be connected to the computer system 112, such as, a USB port, which may be used by a tablet device (not shown). Still yet, the computer system 112 can communicate with one or more networks such as a local area network (LAN), a general wide area network (WAN), and/or a public network (e.g., the Internet) via a network adapter 120. As depicted, a network adapter 120 communicates with the other components of the computer system 112 via the bus 118. It should be understood that although not shown, other hardware and/or software components could be used in conjunction with the computer system 112. Examples include, but are not limited to: microcode, device drivers, redundant processing units, external disk drive arrays, RAID systems, tape drives, and data archival storage systems, etc.

Figure 2:
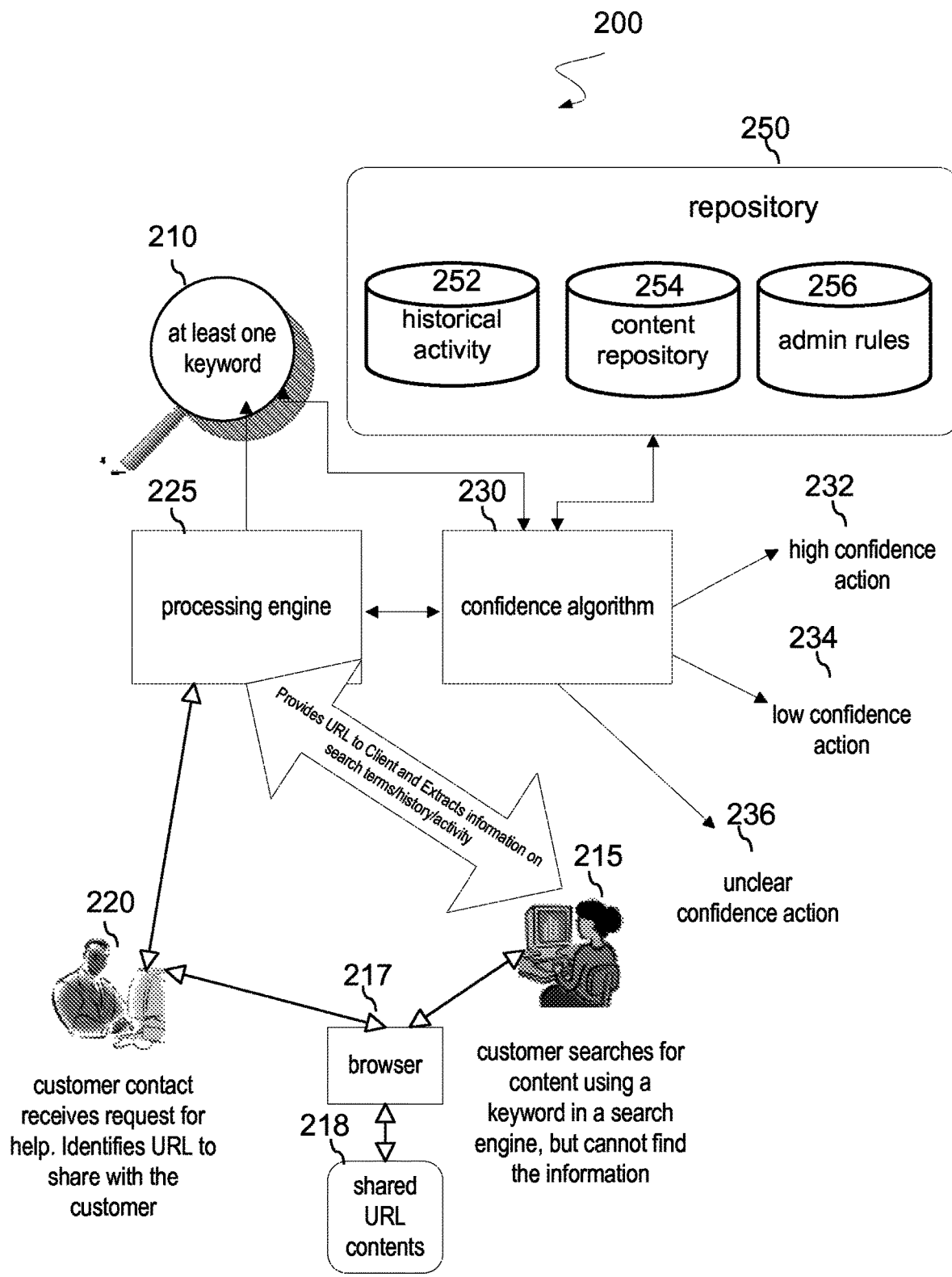
FIG. 2 depicts a functional set of components and a flow of control for retrieving a search history related to finding a URL and identifying updates to the URL to make it easier to find the URL according to an improvement criteria.

FIG. 2 depicts a functional set of components and a flow of control for achieving an embodiment of aspects of the invention, more specifically, for retrieving a search history related to finding a shared URL and identifying updates to the shared URL contents 218 to make it easier to find the shared URL according to an improvement criteria. An aspect of the invention is described in an example scenario. The user is a customer 215 that bought a product. The product could be any product, for example, but not limited to, a leaf blower, a vacuum, an image editor, and etc. The customer 215 is trying to find out why the product is not working properly or how to get it to perform some type operation. The customer 215 brings up a search engine using a Browser 217. The customer 215 tries different words and word combinations while searching for the answer to the question. The Browser 217 returns URLs using its internal search algorithm. The customer 215 may select different URLs returned by the Browser 217. However, none of the selected URLs appear to provide the information to get the product to perform the requested operation. After, a period of time the customer 215 uses Browser 217 by accessing the product's web site and an on-line help support [not shown] interface which contacts some type of product support, hereafter called customer contact 220. Other methods for contact might be used, for example, but not limited to, phone, email, short message service (SMS), texting, posting a message, and etc. The customer contact 220 could be an actual person or even a voice response system with an artificial intelligence (AI) capability.

The customer contact 220 communicates with customer 215 and by clarifying the desired information finds the specific information available as content on a URL and communicates the URL to customer 215. The customer accesses the URL and verifies that the content on the URL contains the information. During this process the URL is identified as a URL to share, a shared URL with shared URL contents 218. In some embodiments, the determination that the shared URL contents 218 resolves the customer 215 request for information may be done when the customer contact 220 identifies the shared URL. In another embodiment, it could be after the customer verifies the information actually resolves the problem via a customer survey. While the customer 215 communicates with customer contact 220 various information is collected. The information may be as simple as key words the customer 215 used with the customer contact 220 to describe the problem initially or it could be as complex as retrieving information about the effort to find the information via searching via Browser 217, posting comments on a forum, social media quenes, and the like. The information, may be, for example, derived from interactions via instant messages between customer 215 and customer contact 220.

The customer contact 220 contains a processing engine 225 that receives the collected information and identifies at least one keyword 210 that the customer 215 tried to use to find the information. The processing engine 225 utilizes confidence algorithm 230 which interfaces with repository 250. The repository 250 may have various elements. The elements may include, but are not limited to, for example, historical activity 252 that captured other search terms used in the past for similar content stored in content repository 254, and admin rules 256 that are followed when interfacing with repository 250. The confidence algorithm 230 associates at least one keyword from the keywords with the shared URL contents 218 and characterizes the at least one keyword to form an at least one keyword shared URL contents 218 characterization. The confidence algorithm 230 attempts to evaluate if the shared URL contents 218 should be revised to reflect a predicted improvement in SEO. Consideration may include historical activity 252 that includes search terms customers have used in the past while searching for similar content. The similar content and a characterization of the similar content may be in content repository 254 that may include other features being searched. The confidence algorithm 230 utilizes the at least one keyword shared URL contents 218 characterization to predict a confidence level of adjusting of the SEO of the shared URL based on changing the at least one keyword in the shared URL contents 218. The change may be an addition of one keyword, a change of a second keyword, an addition of a third keyword, and etc.

The confidence algorithm 230 may apply various admin rules 256 based on different optimization rules. The rules could be by target customer Group, a specific product, a product type, an industry product type, or any other tasks, factors, triggers, and the like. Using the admin rules 256, the confidence algorithm 230 may utilize some type of statistical assessment to predict if a change to the shared URL contents 218 should be made. When the confidence algorithm 230 determines that a missing keyword has a high probability of improving SEO 232, the confidence algorithm performs a high confidence algorithm 232, such as, for example, but not limited to, adding additional information to repository 250 under a predicted improvement to SEO category, updating or changing content in shared URL contents 218, making a recommendation to change the shared URL contents 218, and the like. However, if the confidence algorithm 230 determines that adding a missing keyword has a low probability of improving SEO 234, the confidence algorithm 230 performs a low confidence algorithm 234, such as, for example, but not limited to, making a determination of not adding a missing keyword to the shared URL contents 218, adding the missing keyword to the repository 250 under a not predicted to improve SEO category, a revise product documentation category, and the like. The confidence algorithm 230 may have an Artificial Intelligence (AI) component that learns which search terms are relevant and utilizes a feedback loop adding new evaluations and new results to determine which search terms are relevant. The feedback loop would have expected advantages, such as, speeding up processing time, improving customer satisfaction and increasing the quality of the keywords in the shared URL contents 218 to improve its discoverability to customers.

Figure 3:
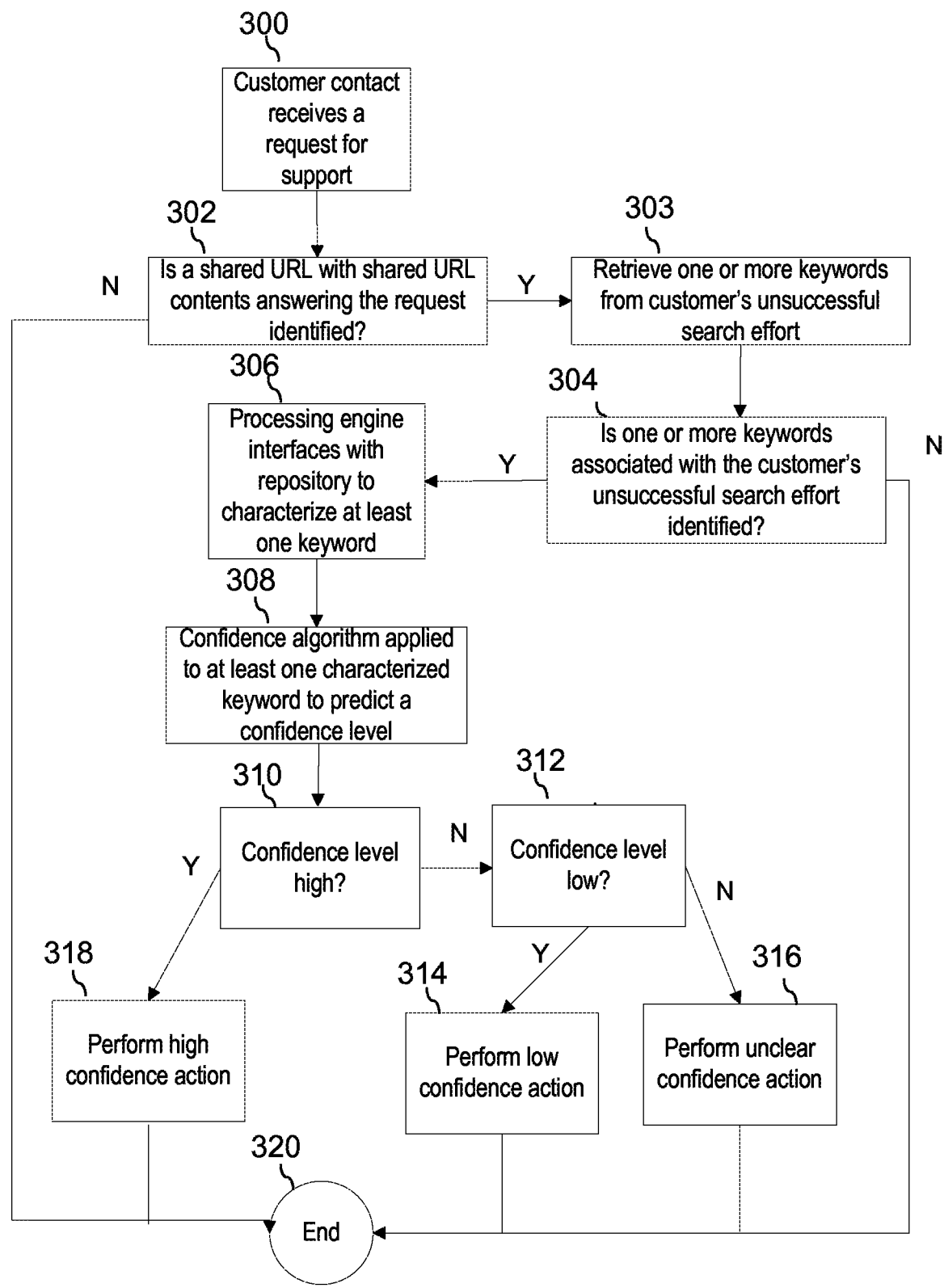
FIG. 3 illustrates a process 300 for an example embodiment of the invention herein comprising the functional components in FIG. 2.

FIG. 3 depicts an example embodiment depicting an example flow of shared URL processing. The process begins at step 300 where a customer 215 has contacted customer contact 220 with a request for support. The contact to customer contact 220 could be via any communication technique. In the example embodiment of FIG. 2, the user utilizes Browser 217 to contact customer contact 220. By way of example and without limitation, other communication techniques such as, telephone, instant messages (IM), shared message services (SMS), forums, social media, texting, smart phone application, and the like may be utilized. The customer contact 220 may even be a voice response system service that itself uses artificial intelligence (AI) to communicate with customer 215. The communication between customer contact 220 and the customer 215 could be, for example and without limitation, one or more of the following: verbal, text, text selections, short message service (SMS), instant message, interactive voice response, numeric keyboard, Browser 217 GUI elements, and the like. The process proceeds to step 302.

If at step 302, the customer contact 220 is unable to identify a URL to share with the customer with the shared URL contents 218 to answer the customer's question, the process proceeds to step 320 and ends. However, if the customer contact 220 identifies a shared URL with the shared URL contents 218 answering the request for support, the process continues to step 303. The shared URL contents 218 may contain, for example and without limitation, directions to perform steps, part replacement information, not supported disclaimer, or any content that helps answer or resolve the question posed by the customer 215. The identification of the shared URL may be provided to the customer 215 via any of the communication technologies. It could be, for example, a description of steps to follow to land on the shared URL contents 218 by utilizing the Browser 217. At step 303, the process continues by attempting to retrieve keywords from the customer's unsuccessful search effort. The determination could be by any means, for example, and without limitation, words spoken by the customer 215 into a voice response system, keywords used in searches utilizing Browser 217, keywords used in an SMS with customer contact 220, keywords used on a forum, and the like. After attempting to retrieve keywords from the customer's unsuccessful search effort, the process proceeds to step 304 where a determination is made as to if there are at least one keyword 210 associated with customer's unsuccessful search effort identified. If there are no at least one keyword 210 identified, the process proceeds to step 320 where no further action is taken. If at least one keyword 210 are identified, the process proceeds to step 306, where the at least onekeyword 210 are used by processing engine 225 to interface with repository 250 to characterize the at least one keyword 210.

The repository 250 may be a database management system (DBMS) supporting indexing, queries, and other typical database features. It could be any data store for recording and retrieving data. The repository 250 may include various elements, for example, but not limited to, historical activity 252 that records a history of interactions by different users by various methods, a content repository 254, that identifies, for example, product features and associates the product features with web pages, user Browser activity when reaching web pages, and admin rules 250 that may determine policies for capturing information, rules for changing Web pages, and the like. The repository 250 may have default rules for tracking of keywords and associating keywords with Web pages. The repository 250 may be adaptive and may automatically adjust based on feedback via artificial intelligence (AI) technology. Although the user interface depicted in FIG. 2 is Browser 217, any user interface may be used. The user interface may provide a GUI where the user inputs parameters as menu entries, command line entries, scripts entries, configuration files, .xml files, or any other means of providing the required information.

In some embodiments, the system may derive the required information from a history of accesses kept by the Browser 217. The Browser 217 or the search engine used by the customer 216 may provide Application Programming Interfaces (APis) such as a Representational state transfer (REST) to support retrieving the Browser 217 search history. As the system may keep track of information extracted from the search history to identify at least one keyword 210 and determine an initial confidence associated with the identified at least one keyword 210 based on patterns of access and queries. During step 306, the processing engine 225 uses confidence algorithm 230 to access the repository 250 and to characterize the at least one keyword 210. The characterization identifies at least one keyword to form an at least one keyword shared URL contents 218 characterization. The process then proceeds to step 308 where the confidence algorithm 230 is applied utilizing the at least one keyword shared URL contents 218 characterization to predict a confidence level of adjusting of the SEO of the shared URL based on changing the at least one keyword in the shared URL contents.

The confidence algorithm 230 formulates queries against the repository 250 to determine how the at least one keyword 210 have been used by others. The historical activity 252 may be retrieved as well as the information from the content repository 254 to find associations between the usages and products. Natural language processing (NLP) may be applied to the historical activity 252, to the at least one keyword 210, and the content repository 254 to categorize each of the at least one keyword 210 and associate them with the shared URL contents 218. Deep analytic analysis and artificial intelligence technologies may be used to adjust the categorization. Feedback from Subject Matter Experts (SMEs), product representatives, and other user feedback may be used to tune the characterization and form a confidence level or ranking that the at least one keyword 210 affect the SEO of the shared URL. In most cases, adding any keyword from the at least one keyword 210 to the shared URL contents 218 is unlikely to reduce the SEO of the shared URL. However, adding some terms may have unwanted side effects. For example, some keywords may not relate to the specific product or cause an undesirable association. Some embodiments may have different processes related to at least one keyword 210 based on different criteria. The actions that follow depend on the confidence level and the admin rules 256.

The illustrative embodiment is based on a predicted improvement of the SEO for the shared URL based on the confidence algorithm 230. Once the confidence level in step 308 is determined, the process continues to step 310. If the confidence is high that adding at least one keyword 210 to the shared URL contents 218 improves the SEO for the shared URL, then the process continues to step 318 where the Perform high confidence algorithm 232 is taken. The at least one keyword 210 are identified as contributing to improving SEO for the shared URL and the confidence algorithm 230 adds the at least one keyword 210 to the repository 250 indicating a high confidence of improving SEO for the shared URL. Depending on the admin rules 256, the at least one keyword 210 may be added to the shared URL contents 218. There may be different rankings for different keywords in the at least one keyword 210 and different steps taken. For example, the admin rules 256 may have different procedures based on number of customer contacts. If a first keyword in at least one keyword 210 is below a threshold number of contacts, no update may be made for the first keyword. However, if a second keyword in at least one keyword 210 is above a threshold number of contacts, an update adding the second keyword may be made to the shared URL contents 218. The update may be automated, for example by adding a tag for the second keyword, adding the second keyword as text, or the update may require a user involvement, for example, by producing a report recommending a change to the text in the shared URL contents 218.

If in step 310, a determination is made that the Confidence level is not high, the process continues to step 312 where a determination is made as to if the Confidence level is low, that is, that the usage of the at least one keyword 210 in the shared URL contents 218 will affect the SEO is below a predetermined low threshold. If the Confidence level is low, then the low confidence algorithm 234 is taken. The low confidence algorithm 234 may proceed by adding at least one keyword 210 to the repository 260 as a low threshold for affecting the SEO. If the determination is made as to if the Confidence level is not low, then the process proceeds to step 316 where the unclear confidence algorithm 236 is taken. The unclear confidence algorithm 236 may be adding the at least one keyword 210 to the repository 250 as an unclear candidate for affecting the SEO, which contributes to captured information for subsequent usage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A non-transitory computer program product for predicting an adjustment of search engine optimization (SEO) of a shared URL due to changing a shared URL contents, the non-transitory computer program product comprising a plurality of instructions stored thereon, which, when executed by a processor, cause the processor to perform operations comprising:
   receiving a shared URL with a shared URL contents answering a question from an unsuccessful search effort by a user to find the shared URL contents;
   associating at least one keyword from the unsuccessful search effort with the shared URL contents;
   characterizing the at least one keyword to form an at least one keyword shared URL contents characterization;
   using a confidence algorithm, utilizing the at least one keyword shared URL contents characterization, to predict a confidence level of adjusting of the search engine optimization (SEO) of the shared URL based on using the at least one keyword to change the shared URL contents, including using the confidence algorithm to access a specified repository to characterize the at last one keyword; and performing an action based on the confidence level.

2. The non-transitory computer program product of claim 1, wherein the using to confidence algorithm to access a specified repository includes using the confidence algorithm to formulate queries against the repository to determine how the at least one keyword has been used.

3. The non-transitory computer program product of claim 2, wherein the repository includes a database of historical activity.

4. The non-transitory computer program product of claim 3, wherein the repository further includes a content database that identifies product features.

5. The non-transitory computer program product of claim 4, wherein the repository further includes a database of administrative rules.

6. The non-transitory computer program product of claim 5, wherein historical activity from the database of historical activity and information from the content database are retrieved to find associations between usages of the at least one keyword and products.

7. The non-transitory computer program product of claim 6, wherein natural language processing is applied to the historical activity, to the at least one keyword, and to the content database to categorize the at least one keyword and to associate the at least one keyword with the shared URL contents.

8. The non-transitory computer program product of claim 1, wherein the utilizing the at least one keyword shared URL contents characterization to predict a confidence level of adjusting of the SEO includes at first times determining that using the at least one keyword to change the shared URL contents has a high probability of improving the SEO of the shared URL, and at second times determining that using the at least one keyword to change the shared URL contents has a low probability of improving the SEO of the stored URL.

9. The non-transitory computer program product of claim 8, wherein the action includes, when using the at least one keyword to change the shared URL contents has a high probability of improving the SEO of the shared URL, adding specified information to the repository.

10. The non-transitory computer program product of claim 8, wherein the action includes, when the at least one keyword to change the shared URL contents has a low probability of improving the SEO of the shared URL, adding the at least one keyword to the repository.

11. A method for predicting an adjustment of SEO of a shared URL due to changing a shared URL contents, the method implemented by a processor, the method comprising:

receiving a shared URL with a shared URL contents answering a question from an unsuccessful search effort by a user to find the shared URL contents;

associating at least one keyword from the unsuccessful search effort with the shared URL contents;

characterizing the at least one keyword to form an at least one keyword shared URL contents characterization;

using a confidence algorithm, utilizing the at least one keyword shared URL contents characterization, to predict a confidence level of adjusting of the search engine optimization (SEO) of the shared URL based on using the at least one keyword to change the shared URL contents, including using the confidence algorithm to access a specified repository to characterize the at last one keyword; and performing an action based on the confidence level.

12. The method of claim 11, wherein the using to confidence algorithm to access a specified repository includes using the confidence algorithm to formulate queries against the repository to determine how the at least one keyword has been used.

13. The method of claim 12, wherein the repository includes a database of historical activity, a content database that identifies product features, and a database of administrative rules.

14. The method of claim 13, wherein historical activity from the database of historical activity and information from the content database are retrieved to find associations between usages of the at least one keyword and products.

15. The method of claim 14, wherein natural language processing is applied to the historical activity, to the at least one keyword, and to the content database to categorize the at least one keyword and to associate the at least one keyword with the shared URL contents.

16. An information handling system for predicting an adjustment of SEO of a shared URL due to changing a shared URL contents, the information handling system comprising:

at least one processor;

a memory coupled to the at least one processor;

a set of instructions stored in the memory and executed by the at least one processor, wherein the set of instructions perform operations including:

receiving a shared URL with a shared URL contents answering a question from an unsuccessful search effort by a user to find the shared URL contents;

associating at least one keyword from the unsuccessful search effort with the shared URL contents;

characterizing the at least one keyword to form an at least one keyword shared URL contents characterization;

using a confidence algorithm, utilizing the at least one keyword shared URL contents characterization, to predict a confidence level of adjusting of the search engine optimization (SEO) of the shared URL based on using the at least one keyword to change the shared URL contents, including using the confidence algorithm to access a specified repository to characterize the at last one keyword; and performing an action based on the confidence level.

17. The information handling system of claim 16, wherein the using to confidence algorithm to access a specified repository includes using the confidence algorithm to formulate queries against the repository to determine how the at least one keyword has been used.

18. The information handling system of claim 17, wherein the repository includes a database of historical activity, a content database that identifies product features, and a database of administrative rules.

19. The information handling system of claim 18, wherein historical activity from the database of historical activity and information from the content database are retrieved to find associations between usages of the at least one keyword and products.

20. The information handling system of claim 19, wherein natural language processing is applied to the historical activity, to the at least one keyword, and to the content database to categorize the at least one keyword and to associate the at least one keyword with the shared URL contents.

* * * * *